(12) United States Patent
Stegall et al.

(10) Patent No.: US 6,917,750 B2
(45) Date of Patent: Jul. 12, 2005

(54) SYSTEM AND METHOD FOR CHARACTERIZING OPTICAL DEVICES

(75) Inventors: David B. Stegall, Austin, TX (US); Dwayne L. LaBrake, Cedar Park, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 148 days.

(21) Appl. No.: 10/447,518

(22) Filed: May 29, 2003

(65) Prior Publication Data

US 2004/0240833 A1 Dec. 2, 2004

(51) Int. Cl.$^7$ ............................................. G02B 6/00
(52) U.S. Cl. ....................................................... 385/147
(58) Field of Search ............................... 385/12, 13, 37, 385/147

(56) References Cited

U.S. PATENT DOCUMENTS

| | | | |
|---|---|---|---|
| 4,360,268 A | | 11/1982 | Zucker et al. |
| 4,391,517 A | | 7/1983 | Zucker et al. |
| 4,685,799 A | | 8/1987 | Brininstool |
| 4,733,068 A | * | 3/1988 | Thiele et al. ........... 250/227.14 |
| 5,142,141 A | * | 8/1992 | Talat et al. ............. 250/227.15 |
| 5,723,857 A | * | 3/1998 | Underwood et al. ... 250/227.14 |
| 5,862,250 A | | 1/1999 | Csipkes et al. |
| 5,973,317 A | * | 10/1999 | Hay ....................... 250/227.14 |
| 6,369,883 B1 | | 4/2002 | Clark |
| 6,426,792 B1 | * | 7/2002 | Yamashita ................ 356/73.1 |
| 6,513,994 B1 | | 2/2003 | DiGiovanni et al. |

FOREIGN PATENT DOCUMENTS

| EP | 0543577 A2 | 5/1993 |
|---|---|---|
| WO | WO 01/69732 A1 | 9/2001 |

OTHER PUBLICATIONS

D.W. Peckham & C.R. Lovelace, "Multimode Optical Fiber Splice Loss: Relating System and Laboratory Measurements"; *IEEE Journal of Lightwave Technology* (Nov. 1987); vol. LT–5, No. 11; pp. 1630–1636.

L. Bjerkan, "Optical Fiber Splice Loss Predictions from One–Way OTDR Measurements Based on a Probability Model"; *IEEE Journal of Lightwave Technology* (Mar. 1989); vol. 7, No. 3; pp. 490–499.

J.P. Meunier & S.I. Hosain, "An Accurate Splice Loss Analysis for Single–Mode Graded–Index Fibers with Mismatched Parameters"; *IEEE Journal of Lightwave Technology* (Nov. 1992); vol. 10, No. 11; pp. 1521–1526.

* cited by examiner

*Primary Examiner*—Ellen E. Kim
(74) *Attorney, Agent, or Firm*—Gregg H. Rosenblatt

(57) ABSTRACT

The invention relates to systems and methods for characterizing optical devices, and particularly to one that characterizes optical devices such as fiber Bragg gratings. In one embodiment, a system and method include the use of two light sources and four detectors to detect light transmitted through an optical device both before and after the light has been transmitted in each direction through the device.

25 Claims, 4 Drawing Sheets

SYSTEM AND METHOD FOR CHARACTERIZING OPTICAL DEVICES

FIELD

The present invention relates to a system and method for characterizing optical devices, and particularly to one that characterizes optical devices such as fiber Bragg gratings.

BACKGROUND

Optical telecommunications networks include a number of optical devices, including fiber optic cables that may extend over long distances. As light travels through the fiber optic cable, it may become dispersed. To correct for dispersion, optical devices such as fiber Bragg gratings (FBG) are often installed in fiber optic networks to improve performance. These and other issues have led to the development of specialty optical fiber products, which have performance characteristics that are different from standard optical fibers. Another type of optical device is a pump stabilization grating, which may be used in optical amplifiers.

To insure that optical devices, such as fiber Bragg gratings, will perform as expected, the devices are typically tested to determine their characteristics. This may be done, e.g., by splicing a fiber Bragg grating into a measurement system using quick splicing fiber interconnect devices, such as the optical fiber splice available from 3M Company of St. Paul, Minn. under the designation FIBRLOK™ Universal Splice. Although this basic system may be useful, if different devices are tested using the same fiber splice, or if different fiber splices are used over time, then the losses or distortions caused by the spliced connections is different in successive tests. In other words, the actual optical characteristics of a device may not be accurately detected because losses or distortion due to the splice would mistakenly be interpreted by the test system as a characteristic of the component. In extreme cases, losses due to splices could make the device characterization appear to be unsatisfactory when compared to a specification, and thus a good device could be thought to have failed to meet the specification. For these and other reasons, a new system and method for characterizing optical devices such as fiber Bragg gratings would be desirable.

SUMMARY

Aspects of the invention herein described are a measuring system and method useful for characterizing the optical properties of an optical device having nontrivial reflection and transmission spectra, such as a fiber Bragg grating. Light is transmitted through the optical device in a first direction, and also in the opposite direction, to determine the optical characteristics of the optical device. The light is sampled or detected both before and after it passes through a spliced-in optical device in each direction, and the information obtained enables the system to accurately characterize the optical device independent of the characteristics of the splices used to connect the optical device to the system.

More specifically, some embodiments of the present invention include measurement systems and associated methods for characterizing an optical component that comprises at least one light source; a first detector for detecting light emitted by the light source(s) prior to the light traveling through the optical component in a first direction and a second detector for detecting light emitted by the light source(s) prior to the light traveling through the optical component in a second opposite direction; and third and fourth detectors for detecting light emitted by the light source(s) after the light has traveled through the optical component in the first and the second direction, respectively. If a single light source is used, a source control optical switch that selectively directs the light either in the first direction or the second direction may be used. The system may further comprise a polarization controller optically located between the light source and the optical device. The polarization controller may be a polarizing fiber.

An embodiment of a system of the present invention may be used to characterize a plurality of optical devices. The system may comprise at least one multi-port sampling optical switch and at least two multi-fiber sampling splices that connect the plurality of optical devices to the measurement system.

One embodiment of the present invention is a system for characterizing an optical device, comprising
a) at least one light source;
b) a first detector for detecting light emitted by the light source(s) prior to the light traveling through the optical device in a first direction and a second detector for detecting light emitted by the light source(s) prior to the light traveling through the optical device in a second direction opposite the first;
c) a third detector for detecting light emitted by the light source(s) after the light has traveled through the optical device in the first direction; and
d) a fourth detector for detecting light emitted by the light source(s) after the light has traveled through the optical device in the second direction,
wherein the first through fourth detectors may be separate devices or may comprise a single device.

Another embodiment of the present invention is a system for characterizing an optical device, comprising
a) at least one wavelength selective light source having an output power $L_b$;
b) an optical device spliced between a first and a second optical coupler wherein the first optical coupler is positioned between a light source and the optical device when light travels in a first direction through the optical device, and the second optical coupler is positioned between a light source and the optical device when light travels in a second direction through the optical device which is opposite the first direction;
c) a first detector for detecting light emitted by the light source(s) prior to the light traveling, through the optical device, in the first direction;
d) a second detector for detecting light emitted by the light source(s) prior to the light traveling through the optical device in the second direction;
e) a third detectors for detecting light emitted by the light source(s) after the light has traveled through at least a portion of the optical device in the first direction; and
f) a fourth detectors for detecting light emitted by the light source(s) after the light has traveled through at least a portion of the optical device in the second direction,
wherein the first through fourth detectors may be separate devices or may comprise a single device.

Another embodiment of the present invention is a method of characterizing an optical device, comprising:
a) emitting light from a light source in a first direction;
b) detecting at least a portion of the light traveling in the first direction from the light source after it passes through at least a first fiber optic coupler;
c) transmitting at least a portion of the light from the light source through at least the first fiber optic coupler, an optical device and a second fiber optic coupler in a first direction wherein a portion of the light is transmitted through the optical device and a portion of the light is reflected by the optical device;

d) detecting a transmitted portion of the light that has passed through the optical device in the first direction;

e) detecting a reflected portion of the light that is reflected by the optical device;

f) emitting light from the light source in a second direction;

h) detecting at least a portion of the light traveling in the second direction from the light source after it passes through a second fiber optic coupler;

i) transmitting at least a portion of the light from the light source in the second direction through the second fiber optic coupler, the optical device and the first fiber optic coupler wherein a portion of the light is transmitted through the optical device and a portion of the light is reflected by the optical device;

j) detecting the transmitted portion of the light that has passed through the optical device in the second direction; and k) detecting the reflected portion of the light that is reflected by the optical device in the second direction.

BRIEF DESCRIPTION OF THE DRAWINGS

The invention will be described with reference to the following figures, in which:

FIG. 3b is an enlarged view of a portion of the spectrum shown in FIG. 3a;

FIG. 4b is an enlarged view of a portion of the spectrum shown in FIG. 4a.

DETAILED DESCRIPTION

Following is a general description of aspects of the invention, including individual components, a system, and a method.

In general terms, a measuring system and method of the present invention are useful for characterizing the optical properties of an optical device having nontrivial reflection and transmission spectra, such as a fiber Bragg grating. Light is transmitted through the optical device in a first direction, and also in the opposite direction, to determine the optical characteristics of the optical device. The light is sampled or detected both before and after it passes through the spliced-in optical device in each direction, and the information obtained enables the system to accurately characterize the optical device independent of the characteristics of the splices used to connect the optical device to the system.

Figure 1:
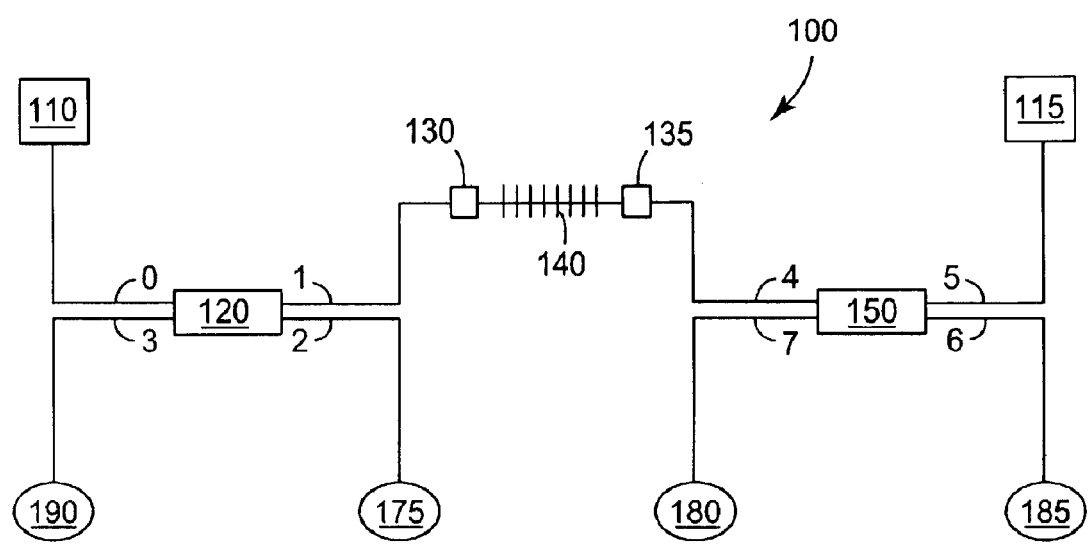
FIG. 1 is a schematic representation of a measurement system according to the present invention.

In a first embodiment of the present invention shown in FIG. 1, a measurement system 100 includes a first and a second light source 110 and 115, four optical detectors 175, 180, 185, and 190, a first and a second coupler, 120 and 150, a first and a second splice 130 and 135 and at least one device or optical device 140 under test. The light sources may be connected to a source control optical switch (not shown), such that one or the other light source, but preferably not both light sources emit light at the same time. Alternatively, a single light source may be used, with the source control optical switch arranged to direct light in the same manner as would two light sources. The light source may be a laser, a broad-spectrum light source, or any other source of electromagnetic radiation that is useful in the characterization of an optical device. If a laser is used, it may be a continuous or a pulsed laser, and a polarization controller (not shown) could be added between the light source and the light source control optical switch. The polarization controller fixes the polarization state of the light emitted by the laser. Without it, the polarization state of the laser-generated light will oscillate due to the birefringent fiber used to pigtail conventional tunable laser modules resulting in polarization dependent loss (PDL) variations as the laser wavelength changes. If a broad-spectrum light source is used, a spectrum analyzer may be placed between the light source and the light source control optical switch to control the wavelength(s) of light that is or are sent through the tested optical device 140.

The first and second optical couplers 120, 150 each have four ports or channels—0, 1, 2 and 3; and 4, 5, 6, and 7, respectively. The couplers divide the incoming light signal into two approximately equivalent output signals, which exit on the opposite side of the coupler from the input port. Light may travel in either direction through the couplers and will be split into two output signals regardless of the direction the light is traveling through the coupler.

The optical detectors are arranged as shown schematically in FIG. 1. Light is emitted in a first direction by a first light source 110 and enters the first optical coupler 120 through port 0. The first coupler splits the light into two signal streams that exit the coupler through port 1, which leads to a first optical splice 130 (and beyond), and through port 2, which leads to a first detector 175. The first detector 175 is thus able to characterize light from the first light source 110, so that the characteristics of the light traveling through splice 130 are known, provided the wavelength dependence of the coupler transmission is known. The transmission of the light through a coupler is characterized by a coupler coefficient herein denoted $C_{mn}$ where the subscript "m" denotes the input port and the subscript "n" denotes the exit port of the light as it travels through the optical coupler. Similarly, light traveling in a second direction is emitted by a second light source 115. The light enters the second optical coupler 150 through port 5. The second coupler 150 splits the light into two streams which exit the second coupler through port 4 which leads to the second splice 135 (and beyond), and through port 7, which leads to a second detector 180. The second detector 180 is thus able to characterize light transmitted through the coupler from the second source 115, so that the characteristics of the light traveling through splice 135 may be determined.

An optical device 140 such as an optical fiber, or a fiber Bragg grating or coupler, is spliced into the system using the first and second splices 130 and 135, as shown. Note that in some instances, the following description may refer to a fiber Bragg grating or simply a grating, but it should be understood that another optical component could be substituted for that grating if desired, so long as the component possesses a nontrivial reflection and nontrivial transmission spectrum. The system, in this embodiment, then operates in the following manner, in which the function of the third and fourth detectors 185 and 190 will also be described.

After light exits the first coupler 120 through port 1, it passes through the first splice 130 and into the optical device 140. The light exits the optical device 140, passes through the second splice 135 and enters the second coupler 150 through port 4. The second optical coupler 150 splits the light into two signals that exit the second optical coupler through port 5, which leads to the second light source 115, and through port 6, which leads to the third detector 185. The light going toward the second light source 115 is ignored. The light detected by the third detector 185 provides information about the characteristics of the light after it has passed through the measurement system 100 and the optical device 140. Some of the light that is sent through the optical component may be reflected back through the first coupler 120 entering through port 1. The first coupler splits the light exiting the coupler through port 0 leading to the first light source and through port 3 to the fourth detector 190 which detects a portion of the reflected signal. The reflected signal containing information about the measurement system and component helps in characterizing the reflective properties of the optical component. The light going toward the first light source 110 is ignored.

A similar detection scheme is carried out for light traveling in the second direction through the optical component and is detailed hereafter. After the light exits the second coupler through port 4, it passes through the second splice 135 and into the optical device 140. The light exits the optical device 140, passes through the first splice 130 and enters the first coupler 120 through port 1. The first optical coupler 120 splits the light into two signals that exit the first optical coupler through port 0, which leads to the first light source 110, and through port 3, which leads to the fourth detector 190. The light going toward the first light source 115 is ignored. The light detected by the fourth detector 190 provides information about the characteristics of the light after it passes through the measuring system and the optical device 140. Some of the light that is sent through the optical component may be reflected back through the second coupler 150 entering through port 4. The second coupler splits the light which exits the second coupler through port 5 leading to the second light source and through port 6 that leads to the fourth detector 190 which detects a portion of the reflected signal. The reflected signal containing information about the test system and component helps in characterizing the reflective properties of the optical component. The light going toward the second light source 110 is ignored.

Using some basic algebraic equations described in further detail below, the measurement system 100 (here defined as all components, including the computer which carries out calculations, but not the device 140 under test) is able to solve for certain variables using the data detected by detectors 175, 180, 185, and 190 to determine both the losses due to the first and second splices 130 and 135 (referred to as "splice transmission," because of the optical power that is lost due solely to the splice(s)), as well as the optical device 140 (referred to as "insertion loss," because of the optical power that is lost when the optical component is inserted into a device or system). The calculations result is a quantitative determination of the reflection and transmission amplitudes versus wavelength for the optical device under test. Splice transmission determination will be described first.

A. Determining Splice Transmission Coefficients

In conventional systems, significant measurement errors may result from variations in the way that an optical device is inserted into the first and second optical splices 130 and 135 of the measurement system 100 and from the manner in which background scans are recorded. This may result in the incorrect characterization of the performance of an optical device. When the splice transmission coefficients are determined in accordance with the present invention, they may be factored out of any measurement relating to the optical device, to provide an accurate determination of the performance of the optical device, where performance is defined as the quantitative determination of the insertion loss and reflectivity and transmissivity versus wavelength of the device under test. The determination of splice, and other system transmission coefficients may be referred to herein as calibration of the system.

To calibrate the system, the optical coupler coefficients as a function of wavelength, $C_{mn}(\lambda)$, and the source spectrum (or source power), $P_s$, are pre-determined. Remembering that the coupler coefficient is the wavelength dependant ratio of the source power transmitted between two coupler ports normalized by the intrinsic source spectrum. In mathematical terms $C_{mn}=P_{mn}/P_s$, where $P_{mn}$ is the source power after transmission between any two coupler ports and $P_s$ is the source power after transmission through a fiber patch cord (in place of an optical device). These values are determined for all the possible port combinations of each coupler prior to the measurement of any device 140 in the test system. By way of example the coupler coefficient $C_{01}(\lambda)$ is determined by transmitting light from source 110 through port 0 of coupler 120 and out port 1 where a detector is connected using a standard connector attached to the coupler. A detector similar to 175 is used for calibration purposes. Once the full set of coupling coefficients have been determined they may be used in the set of equations outlined below to calculate the splice transmission coefficients and grating reflectivity and transmission.

It is possible to describe the system under consideration by a set of simple linear equations. These equations are instrumental in the determination of the splice transmission and optical properties of the device under test. For the purpose of the analysis below the following is assumed:

1. The polarization effects of the light source is negligible (The effects of polarization on measurements will be discussed below).

2. The normalized transmission characteristics versus wavelength of each component in the system other that the splice and device under test are known from previous characterization.

3. All components are assumed to have transmission characteristics that depend on wavelength except for the connector couplings and the splices.

Figure 2:
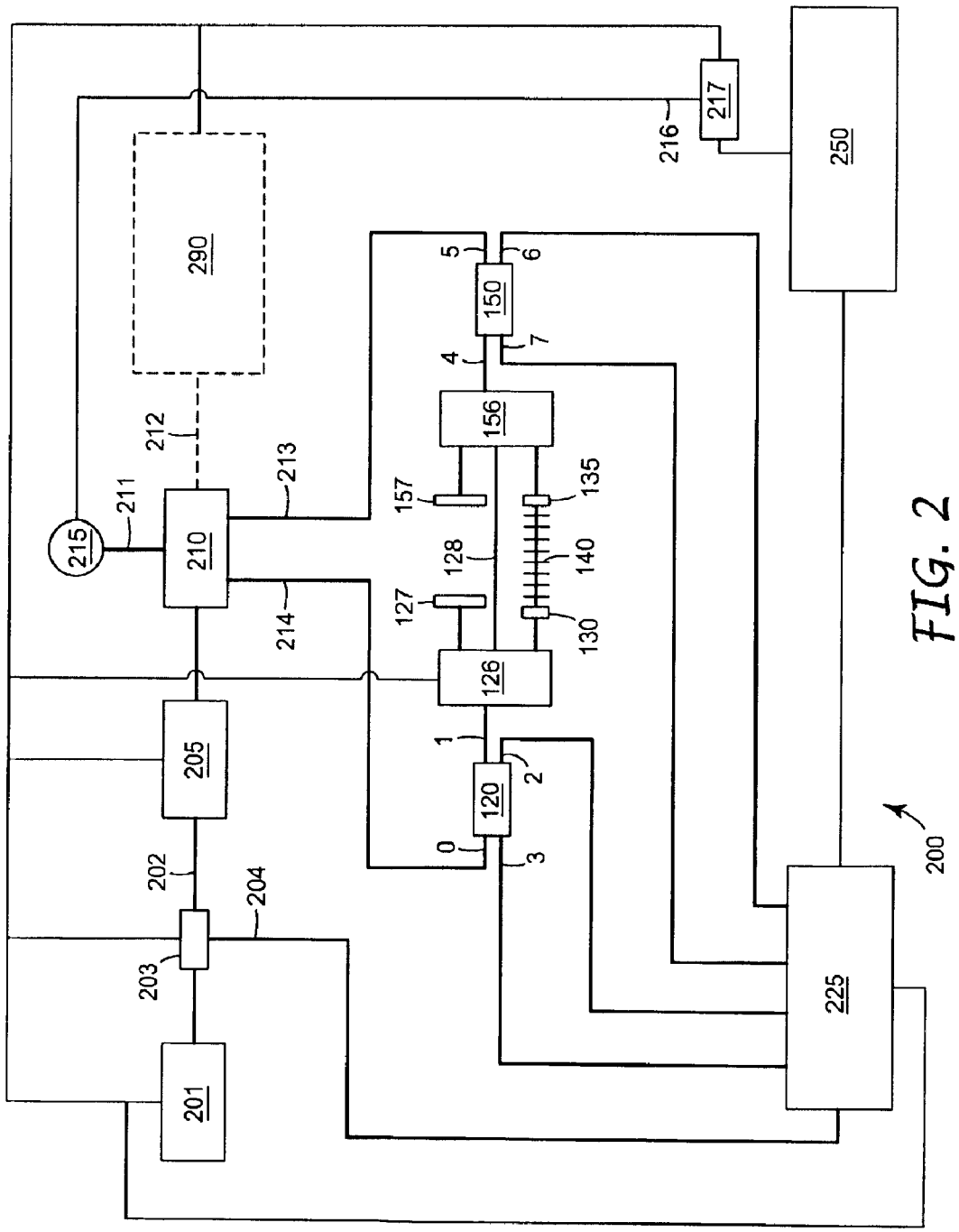
FIG. 2 is a schematic representation of another measurement system according to the present invention.

With these considerations in mind the following set of equations may be written for an optical system as depicted in FIGS. 1 and 2, which includes and an optical device that has been spliced in.

For the first light source 110:

$$D1_1(\lambda)=L_1(\lambda)C_{02}(\lambda)\rho_2(\lambda) \quad (1)$$

$$D2_1=0, \quad (2)$$

$$D3_1(\lambda)=L_1(\lambda)C_{01}(\lambda)S_1T_{opdev}(\lambda)S_2C_{46}(\lambda)\tau_4(\lambda), \quad (3)$$

$$D4_1(\lambda)=L_1(\lambda)C_{01}(\lambda)S_1^2R_{opdev}(\lambda)C_{13}(\lambda)\tau_1(\lambda) \quad (4)$$

where $L_1(\lambda)$ is the optical power from the first light source 110, $C_{nm}(\lambda)$ is the coupler transmission coefficient for light traveling from the $m^{th}$ port to the $n^{th}$ port for a given coupler, $S_1$ and $S_2$ are the first and second splice transmission coefficients associated with the first splice 130 and the second splice 135, respectively. $\tau_i(\lambda)$ is the normalized responsivity of the $i^{th}$ photodetector 1, 2, 3, and 4, (designated in the Figures as 175, 180, 185, and 190, respectively, where i=1 refers to the responsivity of the first photodetector 175, and $R_{opdev}$ and $T_{opdev}$ are the reflectivity and transmissivity of the optical device, respectively. Note that the subscripts for the coupler constants are consistent with the reference numerals in FIGS. 1 and 2. The variables D1($\lambda$), D2($\lambda$), D3($\lambda$), D4($\lambda$), $L_1(\lambda)$ and $L_2(\lambda)$ are measured in watts.

Similar equations written in terms of the second light source 115 may be expressed as, $$D1_2 = 0, \quad (5)$$

$$D2_2(\lambda) = L_2(\lambda) C_{57}(\lambda) \tau_3(\lambda), \quad (6)$$

$$D3_2(\lambda) = L_2(\lambda) C_{54}(\lambda) S_2^2 R_{opdev}(\lambda) C_{46}(\lambda) \tau_4(\lambda). \quad (7)$$

$$D4_2(\lambda) = L_2(\lambda) C_{54}(\lambda) S_2 T_{opdev}(\lambda) S_1 C_{13}(\lambda) \tau_1(\lambda), \quad (8)$$

where $L_2(\lambda)$ is the optical power from the second light source 115. Because the lasers' power ($L_1(\lambda)$ and $L_2(\lambda)$) is wavelength dependent, these terms are eliminated from the equations. This is accomplished by normalizing the equations as follows, $$\frac{D4_1(\lambda)}{D1_1(\lambda)} = R1(\lambda) = \frac{C_{01}(\lambda) C_{13}(\lambda) \rho_1(\lambda)}{C_{02}(\lambda) \rho_2(\lambda)} S_1^2 R_{opdev}(\lambda), \quad (9)$$

$$\frac{D3_1(\lambda)}{D1_1(\lambda)} = T1(\lambda) = \frac{C_{01}(\lambda) C_{46}(\lambda) \rho_4(\lambda)}{C_{02}(\lambda) \rho_2(\lambda)} S_1 S_2 T_{opdev}(\lambda), \quad (10)$$

$$\frac{D3_2(\lambda)}{D2_2(\lambda)} = R2(\lambda) = \frac{C_{54}(\lambda) C_{46}(\lambda) \rho_4(\lambda)}{C_{57}(\lambda) \rho_3(\lambda)} S_2^2 R_{opdev}(\lambda), \quad (11)$$

$$\frac{D4_2(\lambda)}{D2_2(\lambda)} = T2(\lambda) = \frac{C_{54}(\lambda) C_{13}(\lambda) \rho_1(\lambda)}{C_{57}(\lambda) \rho_3(\lambda)} S_1 S_2 T_{opdev}(\lambda). \quad (12)$$

where $R1(\lambda)$ and $T1(\lambda)$ are the measured wavelength dependent reflectance and transmission intrinsic to the system with an optical device in place when light travels through the device in a first direction. They include terms that describe the transmission losses associated with the combination of fiber splices and the reflectivity and the transmissivity of the optical device for a first direction when the first light source 110 is used. $R2(\lambda)$ and $T2(\lambda)$ are the measured wavelength dependent reflectance and transmission intrinsic to the system with an optical device in place when light travels through the device in a second direction. They include terms describing the transmission losses associated with the fiber splices and the reflectivity and the transmissivity of the optical component for s second direction when the second light source 115 is used. Therefore the actual measured spectra may be used to quantify the directionally dependant reflectivities and transmissivities of the system. Before the $T_{opdev}$, $R_{opdev}$, and the splice transmission coefficients may be determined accurately, the initial wavelength-dependence of the measurement system should be eliminated from the equations using the data from the characterization of the couplers as summarized previously and reiterated below in slightly different form. A four-part process is described. For simplicity, connector losses have been neglected since the same coupling using patch cords terminated with connectors will be made when measuring the device 140 under test and these system constants will therefore cancel out.

During the wavelength calibration procedure, fiber optic connectors possessing negligible loss will be used on the ends of each patch cord and connected directly to coupler ports 1 and 4 as specified in the following procedure. Port 1 of the first coupler 120 and port 4 of the second coupler 150 are connected to the ends of a short single mode fiber patch cord (FPC). The first light source 110 is used to perform a wavelength scan. Since the single mode fiber patch cord is completely transmissive, the calibration procedure is without perturbation other than the natural transmission losses associated with the intrinsic nature of the system. Rewriting equation (10) using this information allows for solution of a system constant:

$$T1_{ref}(\lambda) = \frac{D3(\lambda)}{D1(\lambda)} = \frac{L_1(\lambda) C_{01}(\lambda) C_{46}(\lambda) \rho_4(\lambda)}{L_1(\lambda) C_{02}(\lambda) \rho_2(\lambda)} \quad (13)$$

$$= \frac{C_{01}(\lambda) C_{46}(\lambda) \rho_4(\lambda)}{C_{02}(\lambda) \rho_2(\lambda)},$$

where $T1_{ref}(\lambda)$ is the wavelength dependent transmission intrinsic to the system when the first light source 110 is used and $\tau_i(\lambda)$ is the normalized responsivity of the $i^{th}$ detector, which may vary due to environmental conditions such as ambient temperature. Performing a second scan using the second light source 115 and plugging the resulting information into equation (12) yields a second system constant:

$$T2_{ref}(\lambda) = \frac{D4(\lambda)}{D2(\lambda)} = \frac{L_2(\lambda) C_{54}(\lambda) C_{13}(\lambda) \rho_1(\lambda)}{L_2(\lambda) C_{57}(\lambda) \rho_3(\lambda)} \quad (14)$$

$$= \frac{C_{54}(\lambda) C_{13}(\lambda) \rho_1(\lambda)}{C_{57}(\lambda) \rho_3(\lambda)}.$$

where $T2_{ref}(\lambda)$ is the wavelength dependent transmission intrinsic to the system when the second light source 115 is used.

The FPC is disconnected from the system. A fiber patch cord having a pre-characterized high reflectance, low loss mirror is then connected to port 1 of the first coupler 120. A scan is performed using the first light source 110. Light spectra are recorded by the fourth detector 190 (D4) and the first detector 175 (D1). Using this information and equation (9) yields a third system constant.

$$R1_{ref}(\lambda) = \frac{D4(\lambda)}{D1(\lambda)} = \frac{L_1(\lambda) C_{01}(\lambda) R_{ref} C_{13}(\lambda) \rho_1(\lambda)}{L_1(\lambda) C_{02}(\lambda) \rho_2(\lambda)} \quad (15)$$

$$= \frac{C_{01}(\lambda) R_{ref} C_{13}(\lambda) \rho_1(\lambda)}{C_{02}(\lambda) \rho_2(\lambda)},$$

where $R1_{ref}(\lambda)$ is the wavelength dependent reflectance intrinsic to the system when the first light source 110 is used.

The fiber patch cord having a pre-characterized high reflectance, low loss mirror is disconnected from port 1 of the first coupler 120 and connected to port 4 of the second coupler 150. Using the second light source 115, a scan is performed, yielding the fourth system constant from equation (11).

$$R2_{ref}(\lambda) = \frac{D3(\lambda)}{D2(\lambda)} = \frac{L_2(\lambda) C_{54}(\lambda) R_{ref} C_{46}(\lambda) \rho_4(\lambda)}{L_2(\lambda) C_{57}(\lambda) \rho_3(\lambda)} \quad (16)$$

$$= \frac{C_{54}(\lambda) R_{ref} C_{46}(\lambda) \rho_4(\lambda)}{C_{57}(\lambda) \rho_3(\lambda)},$$

where $R2_{ref}(\lambda)$ is the wavelength dependent reflectance intrinsic to the system when the second light source 115 is used.

Removing the inherent wavelength dependence of the coefficients associated with the measurement system apart from the device under test is accomplished by dividing equations (9) through (12) with their respective reference curves, equations (13) through (16), yielding, $$R1_{norm}(\lambda) = \frac{R1(\lambda)}{R1_{ref}(\lambda)} = S_1^2 R_{grat}(\lambda), \quad (17)$$

$$R2_{norm}(\lambda) = \frac{R2(\lambda)}{R2_{ref}(\lambda)} = S_2^2 R_{grat}(\lambda), \quad (18)$$

$$T1_{norm}(\lambda) = \frac{T1(\lambda)}{T1_{ref}(\lambda)} = S_1 S_2 T_{grat}(\lambda), \quad (19)$$

$$T2_{norm}(\lambda) = \frac{T2(\lambda)}{T2_{ref}(\lambda)} = S_1 S_2 T_{grat}(\lambda). \quad (20)$$

where $S_1$ and $S_2$ are the splice transmission coefficients associated with the first and second optical splices, respectively. Note that equations (19) and (20) reveal that the measured values of $T1_{norm}(\lambda)$ and $T2_{norm}(\lambda)$ should be equal. In fact, any discrepancy between them reveals one possible metric of the uncertainty in the ability to determine the splice transmission coefficients.

To calculate the splice transmission coefficients, dividing equation (17) by equation (18) results in $$\frac{R1_{norm}}{R2_{norm}} = \frac{S_1^2}{S_2^2}, \quad (21)$$

Which has no wavelength dependence and thereby allowing $S_2$ to be written in terms of $S_1$, $$S_2 = S_1 \sqrt{\frac{R2_{norm}}{R1_{norm}}}. \quad (22)$$

In the case of a fiber Bragg grating, this value should be calculated near the Bragg wavelength of the optical device to maintain a high signal to noise ratio. Assuming that the optical device is completely transmissive for wavelengths much longer than the Bragg wavelength of the grating ($T_{grat}=1$), then equation (19) may be rewritten as, $$T1_{norm} \approx S_1 S_2. \quad (23)$$

Substituting equation (22) into equation (23) reveals that, $$T1_{norm} = S_1^2 \sqrt{\frac{R2_{norm}}{R1_{norm}}}. \quad (24)$$

Therefore the splice transmission coefficient $S_1$ may be calculated as, $$S_1 = \sqrt{T1_{norm} \sqrt{\frac{R1_{norm}}{R2_{norm}}}}. \quad (25)$$

Substituting equation (25) back into equation (22) then permits the calculation of $S_2$. Assuming that the transmission goes to unity for wavelengths far beyond the Bragg wavelength is not always true. For cases where UV-writing induces absorption, the relationship between UV dosage and absorption is well known and deterministic. It is therefore possible to predict the UV-induced losses and equation (23) could be scaled accordingly. In this manner, splice transmission for the system may be determined, and used to correct insertion loss measurements so that they are accurate. Once $S_1$ and $S_2$ are known they may be substituted into equations 17 through 20 to allow determination of the reflectivity and transmission of the device under test.

B. Polarization Effects

For simplicity, the analysis and measurement process described above did not consider polarization effects associated with the various devices. In a real system, the transmission characteristics of the system components including the device under test are polarization sensitive. This means their transmission spectra exhibit a dependence on the launch polarization state. Four sets of equations may be written that will be analogous to equations 9–12 and 13–16 which account for the four possible different polarization states. These four sets of equations correspond to the four principal states of polarization as defined in the Mueller Method for the measurement of polarization dependant losses (PDL). The PDL of several devices must be taken into account for accurate determination of the true reflection and transmission spectrum of the device under test. Applying the Mueller Method also provides the polarization dependence of the reflection and transmission spectrum of the device under test.

A general advantage of this technique is that the system may be calibrated and characterized once so that repeated calibration is not necessary for every sample measurement. It is recommended that calibration be accomplished the first shift of every day.

C. System for Measuring Insertion Losses

FIG. 2 illustrates a second embodiment of the present invention, in which a system including a computer interface is used. The fundamental principles described in the first embodiment of this invention apply in this embodiment as well, and as a result the same reference numeral convention will be maintained throughout whenever possible. This figure shows a complete schematic representation of a measurement system 200 used to measure insertion loss and PDL for simple optical components, bare Bragg gratings and the like so long as the device 140 has both a nontrivial reflection and nontrivial transmission spectra. Both of these are used in calculating the splice transmission.

In this embodiment of the invention, the two separate light sources 110 and 115 have been replaced with a single light source unit comprising a tunable laser 201 and a 1-by-4 source control optical switch 210. The tunable laser is attached to a 90/10 splitter 203, a polarization controller 205, which is attached to optical switch 210. The tunable laser may have a wavelength range of about 1530 nm to about 1630 nm. The 90/10 splitter splits the incoming light into two output signals having a 90/10 power ratio. The low power output 204 goes to the power meter 225, which is used to monitor the stability of the laser 201. The high power output 202 is fed from the 90/10 splitter 203 into the polarization controller 205 and then into the 1-by-4 source control optical switch 210. Alternatively, a source control switch having more output channels for future design flexibility may replace the 1-by-4 source control optical switch 210. A first output channel 211 is connected to a simple detector 215 for monitoring the optimized position of the linear polarizer in the polarization controller 205 for maximum transmitted optical power through waveguide 213 or 214 depending on the measurement being made and the direction that the light need to pass through the device to make the desired measurement. The signal 216 from the simple detector 215 is connected to a digital acquisition (DAQ) board 217, which provides feedback control to the tunable laser 201, and to computer 250, which controls the overall measurement system 200. A second output channel 212 may be connected to a dispersion module 290 capable of measuring the polarization mode dispersion of the device 140. The specifics of the dispersion module are not described herein, but are known to one skilled in the art. Also, the optical paths linking the dispersion module 290 to the device under test 140 are not shown in FIG. 2. The third and fourth outputs 213, 214 from optical switch 210 are attached to a system similar to that shown in the first embodiment of this invention except that in FIG. 2, 201 and 210 replace the first and second light sources 110 and 115 of the first embodiment.

The two couplers 120, 150 function in the same manner as described in the first embodiment. However, in contrast to the first embodiment, in which ports 2 and 3 of the first couplers 120 and ports 6 and 7 of the second coupler 150 are connected to four separate photodetectors, in this embodiment all four ports are connected to a high-speed power meter 225, which has at least four temperature-controlled detector channels. Port 0 of the first coupler 120 is connected to the fourth output 214 from the 1-by-4 source control switch 210. Port 1 of the first coupler 120 is connected to a first 1-by-3 directional optical switch 126. The outputs from the first 1-by-3 directional optical switch are connected to a first well-characterized low loss mirror 127, a fiber optic patch cord 128 which is connected to a second 1-by-3 directional optical switch 156, and a first optical splice 130. An optical device 140 (such as a bare fiber grating) may be attached to the first optical splice 130 and a second optical splice 135. The second optical splice 135 is connected to the second 1-by-3 directional optical switch 156. The second optical switch 156 is also connected to a second well-characterized low loss mirror 157 and to port 4 of the second coupler 150. Port 5 of the second coupler 150 is connected to the third output 213 from the 1-by-4 source control switch 210. The low loss mirrors 127, 157 and the fiber optic patch cord 128 are used to calibrate the measurement system 200 on a periodic basis.

The computer 250 is electronically connected to the tunable laser source 201; the polarization controller 205; the 1-by-4 source control optical switch 210; the first and second 1-by-3 directional optical switches 126, 156; and the power meter 225, to allow for computer control of the entire measurement system 200.

D. Components

Although the characteristics of the various components described in general terms above may be selected from among known components, the following are provided by way of example. The light sources may be lasers of the type currently available from New Focus, Inc. of San Jose, Calif. under the designation New Focus 6528-LN. The polarization controller may be of the type currently available from Hewlett Packard of Santa Rosa, Calif. under the designation HP 8169A. The couplers are preferably 3 dB couplers, and may be of the type currently available from Oplink of San Jose, Calif. The splices may be those available from 3M Company of St. Paul, Minn. or Austin, Tex. under the designation FIBERLOK™, or may be other fiber optic couplers, fusion splices, or mechanical splices. The detectors may be in the form of multiple simple photodetectors of the type currently available from ThorLabs of Newton, N.J. or Analogue Module of Longwood, Fla. More preferably, a high speed power meter having a high dynamic range, low polarization sensitivity, and low noise acquisition containing at least four temperature-controlled detector channels of the type currently available from dBm Optics of Lafayette, Colo. under the designation dBm Optics CSA may be used in place of the simple photodetectors.

System Calibration

Splice transmission coefficients, $S_1$ and $S_2$, change every time a new optical component is inserted into a system, and thus are taken into account as described above. Certain components of the system itself, however, may also change over time, and thus the system components must be calibrated or "zeroed out" periodically so that errors attributable to those components are eliminated or minimized.

The system calibration may be categorized into two groups according to preferred frequency of performing the procedure. The group I calibration is only conducted after significant environmental changes or significant time has passed since the previous calibration. The group II calibration should be performed frequently, perhaps on a daily basis.

A. Group I Calibration Procedures

The components of the measurement system that may require recalibration after either significant environmental change or significant passage of time include the optical switches and the calibration mirrors.

Referring to FIG. 2, the device 140 under test is connected to optical switches (126, 156) in the measurement system 200. These optical switches must be optically characterized. The insertion loss of the optical switches must be known independently from the optical device 140 under test so that it may be accounted for in the calculation of the true insertion loss of the optical device. A fiber patch cord is connected across the optical switch channels normally used for the optical device under test to test the insertion loss of that light path through the optical switches. The measurement is then placed in a file for later retrieval. This step facilitates the automated referencing of transmission and reflection, which will be described in the group II calibration procedures. These steps are easily built into the measurement system software to minimize the operator's manual work. According to the switch manufacturer's specifications, the PDL is typically around 0.02 dB. Because this value is very small, the polarization-dependent behavior of the switch may be neglected.

It is important to note that the four detector channels of the high speed power meter 225 are analogous to the four detectors shown in FIG. 1. In the following description of the calibration procedure, the detector numbering of FIG. 1 will be used to refer to the analogous detector channels of FIG. 2.

To calibrate the measurement system 200 of the second embodiment, the first and second optical switches 126, 156 should be adjusted such that the light will be transmitted through an optical fiber patch cord that replaces the first and second splice 130 and 135, and the optical device 140. The laser 201 is scanned. The light is transmitted through optical switch 210 in a first direction into waveguide 214. After passing through the device under test 140, the ratio of the third detector over the first detector (D3/D1) is measured and saved. A 10 picometer (pm) step size is sufficient to characterize the slow variation in the spectrum of the switch. This procedure is repeated for light transmitted in the opposite direction (from waveguide 213), and the fourth and second detectors to create the ratio of D4/D2.

Next, the first optical switch 126 is adjusted such that the light will be transmitted to the first low loss mirror 127. The laser 201 is scanned and the ratio of the first and fourth detectors (D4/D1) is measured. This is repeated for the second optical switch using calibration mirror 157 with the light being transmitted in the second direction. The laser is scanned and the ratio of the second and third detectors (D3/D2) is measured. The results of this calibration procedure are saved as reference data files on the computer 250 for use during later measurements.

B. Group II Calibration Procedures

Because the laser's polarization state may drift over time, the systems for making transmission and/or reflection measurements must be routinely calibrated. This drift has at least two implications—one is an unnecessary power loss at the linear polarizer of the polarization controller and another is a less than ideal calibration for making polarization dependent measurements. The data files from the group I calibration procedures will be used to make the final calibrations. A 10 pm step size is sufficient to characterize the slowly varying behavior. A finer step size results in an unreasonable time to conduct this step.

To calibrate the transmission measurements for the measurement system 200 of the second embodiment: optimize the position of the linear polarizer in the polarization controller 205 for maximum transmitted optical power. Activating output channel 211 and using the simple detector 215 accomplish this.

The first and second optical switches 126, 156 are adjusted such that the light will be transmitted through the optical fiber patch cord 128 from the fourth output 214 from optical switch 210. The laser 201 is scanned with light traveling in a first direction and the ratio of the third detector over the first detector (D3/D1) is measured. The laser is scanned four times, each with one of the four prescribed polarization states. The results of each scan is divided by the corresponding data file from the group I calibration procedure and saved. This procedure is repeated for light traveling in the second direction through the system from the third output 213 from optical switch 210 and the second and fourth detectors to create the ratio of D4/D2.

To calibrate the reflection measurements for the measurement system 200 of the second embodiment, the first 1-by-3 directional optical switch 126 is adjusted such that the light will be transmitted to the first low loss mirror 127 when the light is transmitted from the fourth optical switch output 214 to the first 1-by-3 directional optical switch 126. The light will be reflected by the mirror 127 and pass through the first 3 dB coupler 120 for a second time. The laser 201 is scanned with each of the four prescribed polarization states. The ratio of light detected by the first and fourth detectors is measured and D4/D1 is calculated. The results of the each scan are divided by the corresponding data file from the group I calibration procedure and saved. This procedure is repeated using the second low loss mirror 157 with the light transmitted from the third optical switch output 213 through the second 1-by-3 directional optical switch 156 in order to measure the ratio of D3/D2 from the second and third detectors.

EXAMPLES

Figure 3A:
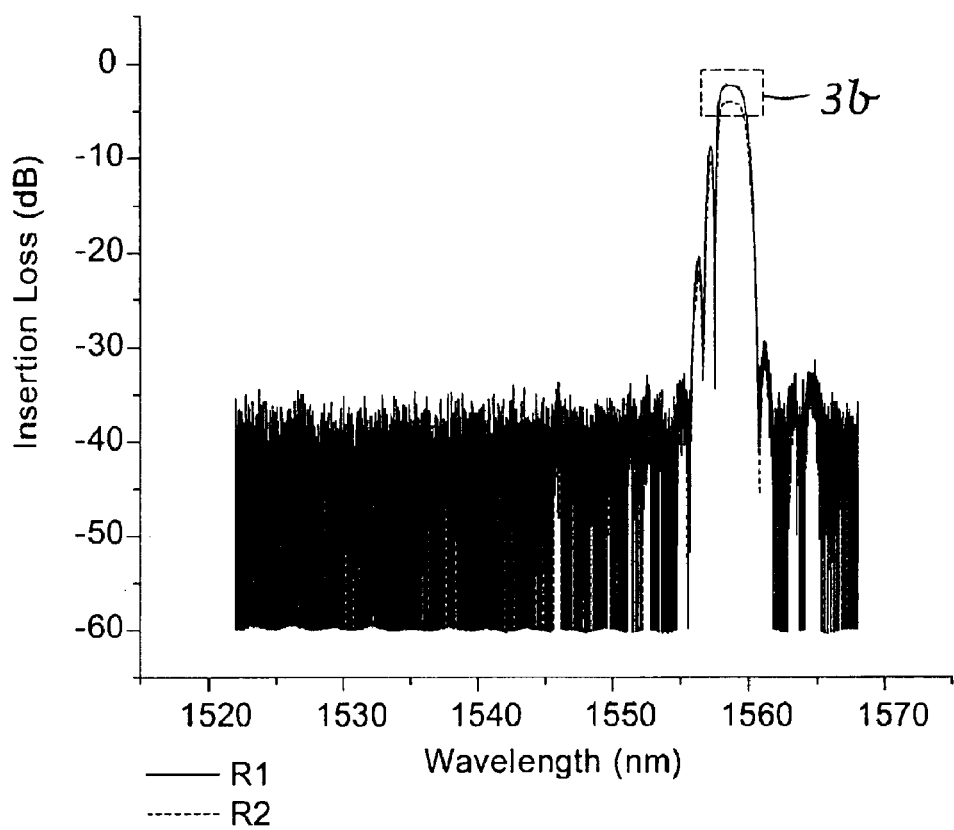
FIG. 3a is a reflection measurement of a non-chirped gaussian apodized fiber Bragg grating showing the grating spectra as measured.
Figure 3B:
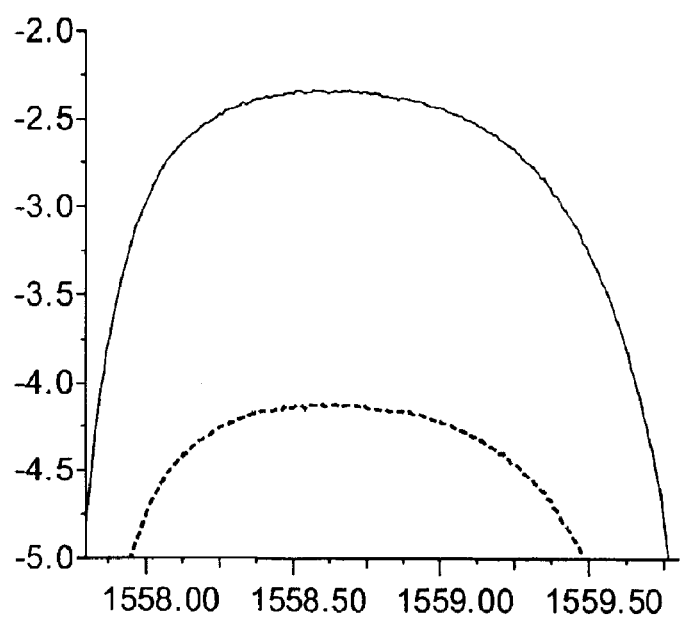
Figure 4A:
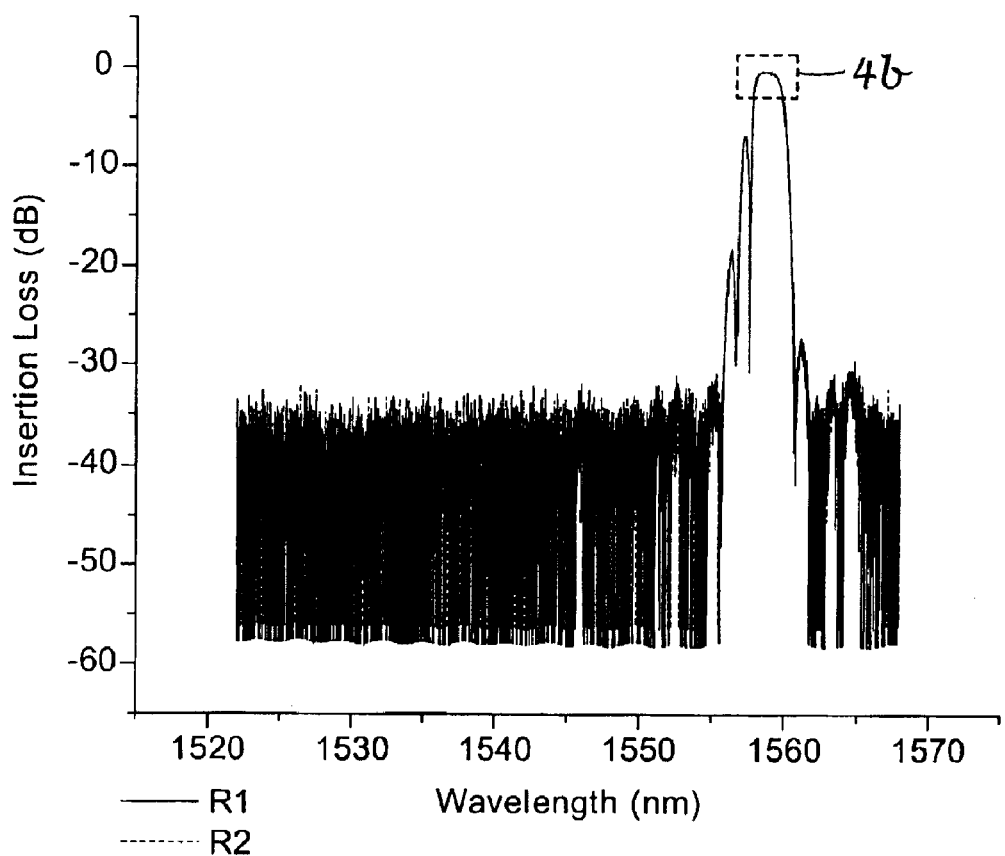
FIG. 4a is a reflection measurement of a non-chirped gaussian apodized fiber Bragg grating showing the grating spectra after correction of the splice transmission.
Figure 4B:
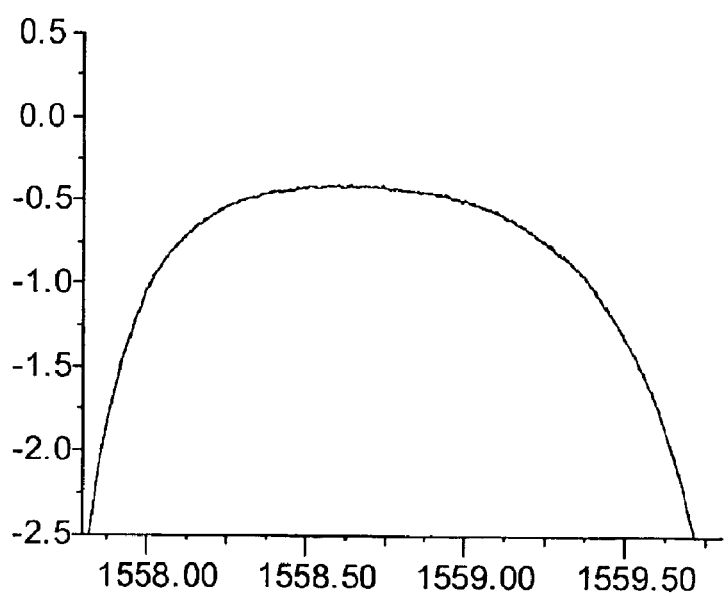

An experiment was performed to study the reliability of this technique for measuring splice transmission variations. FIG. 3a illustrates the insertion loss spectrum, in reflection, of a non-chirped gaussian apodized fiber Bragg grating (FBG) including splice transmission variations. The reflectivity R1 was achieved when the grating was illuminated with the light passing from a first 3 dB coupler 120 in FIG. 2 and then through the optical device (the FBG in this case) 140 (from the left). The reflectivity R2 was achieved when the optical device was illuminated with the light passing from a second 3 dB coupler 150 in FIG. 2 and then through the optical device 140 (from the right, schematically). FIG. 3b is a closer view of the peak reflection region around 1558.5 nm. In FIG. 3a, the effect of splice transmission variations may be observed by the peak height difference between R1 and R2 where R1−peaks at −1.015 dBm and R2 peaks at −2.804 dBm. In a manufacturing environment insertion loss of a device may be used as a pass/fail criteria. If the insertion loss of the device is confounded by poor splice repeatability the component could be discarded. Large splice transmission losses are indicated in FIGS. 3a and 3b such that the values of R1 and R2 are significantly different and greater than zero dB. If it is shown that the magnitude and difference is due to incorrect insertion of the grating into the test equipment, the grating may not fail the product specifications. FIGS. 4a and 4b show the spectra after correction using the techniques and analysis described above for the splice transmission, R1 peaks at −0.406 dBm and R2 peaks at −0.411 dBm. In these figures, the values of R1 and R2 are indistinguishable from each other. This example illustrates the utility of this invention, in that little difference in the splice transmission coefficients $S_1$ and $S_2$ is observed and the overall transmission loss is near the value expected for such a grating device.

To demonstrate the robustness of the technique, the same FBG was subjected to the following conditions: bare fiber leads inserted into fiber splices and bare leads incorrectly placed in fiber splices. Table 1 shows that for the case of correct use of fiber splices against a case where the fibers was improperly inserted into at least one of the two fiber splices, there is a discrepancy in the peak reflectivity after splice transmissions are removed. Comparing the data for the fibers that were properly and improperly inserted into the splices, the data in Table 1 illustrates the ability of this measurement scheme to compensate for differences in the splice transmission between the two optical leads as seen in comparing the reflectivities, R1 and R2, in both configurations.

TABLE 1

Results of measuring a FBG for the following splice conditions: (1) correctly used FIBRLOK ™, and (2) incorrectly splicing the second FIBRLOK ™. The peak reflectivity was measured at 1558.57 nm for all cases.

|  | Correct fiber splices | Incorrect second fiber splice |
|---|---|---|
| Splice 1 Loss | 0.966 dB | 0.966 dB[1] |
| Splice 2 Loss | 0.932 dB | 1.858 dB |
| $R1_{max}$ Insertion Loss | 0.410 dB | 0.406 dB |
| $R2_{max}$ Insertion Loss | 0.411 dB | 0.411 dB |

[1]The fiber in the first splice was not repositioned.

Variations of the Invention

Various changes may be made in the components and arrangement of the various components of the invention. For example, and as noted above, the light source may be either a single or multiple light sources, and may be either a laser or a broad-spectrum light source.

Those skilled in the art will appreciate that the present invention may be used in the manufacture of a variety of optical components. While the present invention has been described with a reference to exemplary preferred embodiments, the invention may be embodied in other specific forms without departing from the spirit of the invention. Accordingly, it should be understood that the embodiments described and illustrated herein are only exemplary and should not be considered as limiting the scope of the present invention. Other variations and modifications may be made in accordance with the spirit and scope of the present invention.

We claim:

1. A system for characterizing an optical device, comprising:
   a) at least one light source;
   b) a first detector for detecting light emitted by the light source(s) prior to the light traveling through the optical device in a first direction and a second detector for detecting light emitted by the light source(s) prior to the light traveling through the optical device in a second direction opposite the first;
   c) a third detector for detecting light emitted by the light source(s) after the light has traveled through the optical device in the first direction; and
   d) a fourth detector for detecting light emitted by the light source(s) after the light has traveled through the optical device in the second direction,
wherein the first through fourth detectors may be separate devices or may comprise a single device.

2. The system of claim 1, wherein the system further comprises a processor that uses information detected by the first, second, third, and fourth detectors to characterize the optical device.

3. The system of claim 1, wherein the system further comprises a directional optical switch that selectively directs the source light either in the first direction or the second direction.

4. The system of claim 1 including a first and a second light source and a source control optical switch that activates one or both of the first or the second light source.

5. The system of claim 1, wherein the system further comprises a polarization controller optically located between the light source and the optical device.

6. The system of claim 5, wherein the polarization controller is a polarizing fiber.

7. The system of claim 1, wherein the system further includes an optical device having a measure of reflectivity and transmissivity to be characterized by the system.

8. The system of claim 1, wherein the system may characterize a plurality of optical devices, the system further comprising at least one multi-port optical sampling switch and at least one multi-fiber connection point that connects the plurality of optical devices.

9. The system of claim 1, further comprising at least one optical coupler between the light source and detectors on either side of the optical device.

10. The system of claim 9, where the optical coupler has as a polarization dependent loss value less than 0.05 dB.

11. A system for characterizing an optical device, comprising
   a) at least one wavelength selective light source having an output power $L_b$;
   b) an optical device spliced between a first and a second optical coupler wherein the first optical coupler is positioned between a light source and the optical device when light travels in a first direction through the optical device, and the second optical coupler is positioned between a light source and the optical device when light travels in a second direction through the optical device which is opposite the first direction;
   c) a first detector for detecting light emitted by the light source(s) prior to the light traveling, through the optical device, in the first direction;
   d) a second detector for detecting light emitted by the light source(s) prior to the light traveling through the optical device in the second direction;
   e) a third detectors for detecting light emitted by the light source(s) after the light has traveled through at least a portion of the optical device in the first direction; and
   f) a fourth detectors for detecting light emitted by the light source(s) after the light has traveled through at least a portion of the optical device in the second direction, wherein the first through fourth detectors may be separate devices or may comprise a single device.

12. The system of claim 11 wherein the optical device has a first characteristic transmissivity (T1) and a first characteristic reflectance (R1) when irradiated from a first direction and second characteristic transmissivity (T2) and a second characteristic reflectance (R2) when irradiated from a second direction.

13. The system of claim 12 wherein the first characteristic reflectance (R1) is measured by the fourth detector, wherein the light is emitted by the light source in the first direction, the light travels through the first coupler, through at least a portion of the optical device before a portion of the light is reflected, the reflected light travels back through the first coupler and is received by the fourth detector.

14. The system of claim 13 wherein the first detector has a responsivity, $\rho_1(\lambda)$; the second detector has a responsivity, $\rho_2(\lambda)$; the third detector has a responsivity, $\rho_3(\lambda)$; and the fourth detector has a responsivity, $\rho_4(\lambda)$.

15. The system of claim 13 wherein the first coupler has four ports designated 0, 1, 2, and 3, respectively, and the second coupler has four ports designated 4, 5, 6, and 7, respectively.

16. The system of claim 15 wherein the optical device is positioned between port 1 of the first coupler and port 4 of the seond coupler, wherein splice transmission coefficients $S_1$ and $S_2$ characterize the splice transmission and wherein the optical device is characterized by reflectively $R_{opdev}(\lambda)$ and transmission $T_{opdev}(\lambda)$.

17. The system of claim 21 wherein light traveling through the coupler between any two ports is characterized by a coupler coefficient, $C_{mn}(\lambda)$, where m designates the port through when light enters the coupler and n designates the port through which light leaves the coupler.

18. The system of claim 17 wherein $T_1(\lambda)$, $R_1(\lambda)$, $T_2(\lambda)$ and $R_2(\lambda)$ are given by $$R1(\lambda) = \frac{C_{01}(\lambda)C_{13}(\lambda)\rho_1(\lambda)}{C_{02}(\lambda)\rho_2(\lambda)} S_1^2 R_{opdev}(\lambda),$$

$$T1(\lambda) = \frac{C_{01}(\lambda)C_{46}(\lambda)\rho_4(\lambda)}{C_{02}(\lambda)\rho_2(\lambda)} S_1 S_2 T_{opdev}(\lambda),$$

$$R2(\lambda) = \frac{C_{54}(\lambda)C_{46}(\lambda)\rho_4(\lambda)}{C_{57}(\lambda)\rho_3(\lambda)} S_2^2 R_{opdev}(\lambda),$$

$$T2(\lambda) = \frac{C_{54}(\lambda)C_{13}(\lambda)\rho_1(\lambda)}{C_{57}(\lambda)\rho_3(\lambda)} S_1 S_2 T_{opdev}(\lambda).$$

19. The system of claim 12 wherein the second characteristic reflectance (R2) is measured by the third detector, wherein the light is emitted by the light source in the second direction, the light travels through the second coupler, through at least a portion of the optical device before a portion of the light is reflected, the reflected light travels back through the second coupler and is received by the third detector.

20. The system of claim 12 wherein the first characteristic transmissivity (T1) is determined from the light entering the third detector wherein the light is emitted by the light source in a first direction, the light passes through the first coupler, the optical device and the second coupler before being measured by third detector.

21. The system of claim 12 wherein the second characteristic transmissivity (T2) is determined from the light entering the fourth detector wherein the light is emitted by the light source in a second direction, the light passes through the second coupler, the optical device and the first coupler before being measured by fourth detector.

22. A method of characterizing an optical device, comprising:

a) emitting light from a light source in a first direction;

b) detecting at least a portion of the light traveling in the first direction from the light source after it passes through at least a first fiber optic coupler;

c) transmitting at least a portion of the light from the light source through at least the first fiber optic coupler, an optical device and a second fiber optic coupler in a first direction wherein a portion of the light is transmitted through the optical device and a portion of the light is reflected by the optical device;

d) detecting a transmitted portion of the light that has passed through the optical device in the first direction;

e) detecting a reflected portion of the light that is reflected by the optical device;

f) emitting light from the light source in a second direction;

h) detecting at least a portion of the light traveling in the second direction from the light source after it passes through a second fiber optic coupler;

i) transmitting at least a portion of the light from the light source in the second direction through the second fiber optic coupler, the optical device and the first fiber optic coupler wherein a portion of the light is transmitted through the optical device and a portion of the light is reflected by the optical device;

j) detecting the transmitted portion of the light that has passed through the optical device in the second direction; and k) detecting the reflected portion of the light that is reflected by the optical device in the second direction.

23. The method of claim 22 wherein the different portions of the light are detected by at least four different detector devices.

24. The method of claim 22 wherein at least two different portions of the light are detected by a single detector devices.

25. The method of claim 22 wherein the different portions of the light are detected by a single detector device.

* * * * *

UNITED STATES PATENT AND TRADEMARK OFFICE
CERTIFICATE OF CORRECTION

PATENT NO. : 6,917,750 B2
DATED : July 12, 2005
INVENTOR(S) : Stegall, David B.

It is certified that error appears in the above-identified patent and that said Letters Patent is hereby corrected as shown below:

Column 6,
Line 55, after "$\rho_2(\lambda)$" insert -- , --.
Line 58, after "$C_{46}(\lambda)$" delete "$\tau_4$" and insert -- $\rho_4$ -- therefor.
Line 59, after "$C_{13}(\lambda)$" delete "$\tau_1$" and insert -- $\rho_1$ -- therefor.
Line 66, delete "$\tau_i$" and insert -- $\rho_i$ -- therefor.

Column 7,
Line 13, after "$C_{57}(\lambda)$" delete "$\tau_3$" and insert -- $\rho_3$ -- therefor.
Line 15, after "$C_{46}(\lambda)$" delete "$\tau_4$" and insert -- $\rho_4$ -- therefor.
Line 17, after "$C_{13}(\lambda)$" delete "$\tau_1$" and insert -- $\rho_1$ -- therefor.

Column 8,
Line 17, delete "$\tau_t$" and insert -- $\rho_t$ -- therefor.

Column 13,
Line 67, delete "R1-peaks" and insert -- R1 peaks -- therefor.

Column 15,
Line 65, delete "detectors" and insert -- dectector -- therefor.

Column 16,
Line 1, delete "detectors" and insert -- dectector -- therefor.
Line 29, delete "seond" and insert -- second -- therefor.
Line 31, delete "reflectively" and insert -- reflectivity -- therefor.
Line 33, delete "claim 21" and insert -- claim 15 -- therefor.
Line 36, delete "when" and insert -- which -- therefor.

Signed and Sealed this

Fourth Day of October, 2005

JON W. DUDAS
*Director of the United States Patent and Trademark Office*